United States Patent [19]

Elser

[11] 4,367,672

[45] Jan. 11, 1983

[54] AUXILIARY POWER STEERING, ESPECIALLY FOR MOTOR VEHICLES

[75] Inventor: Dieter Elser, Essingen-Lauterburg, Fed. Rep. of Germany

[73] Assignee: Zahnradfabrik Friedrichshafen, AG, Friedrichshafen, Fed. Rep. of Germany

[21] Appl. No.: 172,551

[22] Filed: Jul. 28, 1980

[30] Foreign Application Priority Data

Jul. 27, 1979 [DE] Fed. Rep. of Germany ....... 2930498

[51] Int. Cl.³ .......................... F15B 15/22; F15B 9/10
[52] U.S. Cl. ...................................... 91/375 A; 91/401
[58] Field of Search .................... 91/401, 400, 375 A, 91/375 R, 229

[56] References Cited

U.S. PATENT DOCUMENTS

| 1,299,668 | 4/1919 | Blomquist | 91/401 |
| 2,261,444 | 11/1941 | Neubert, Jr. | 91/401 |
| 3,240,008 | 3/1966 | McMullen | 91/401 |
| 3,253,515 | 5/1966 | Wilkinson | 91/401 |
| 3,896,703 | 7/1975 | Bertanza | 91/401 |
| 4,261,248 | 4/1981 | Elser et al. | 91/401 |

Primary Examiner—Paul E. Maslousky
Attorney, Agent, or Firm—Zalkind & Shuster

[57] ABSTRACT

Dual function valve assemblies mounted within the operating piston of a power steering servomotor, control the flow of pressurized fluid between opposing piston chambers to both limit travel of the piston and limit the maximum pressure developed within the pressurized chamber by cutting off the pressure as the piston approaches a limit position and relieving excess pressure during piston travel.

6 Claims, 2 Drawing Figures

AUXILIARY POWER STEERING, ESPECIALLY FOR MOTOR VEHICLES

BACKGROUND OF THE INVENTION

This invention relates to auxiliary power steering systems for automotive vehicles of the type in which a servomotor operating piston drivingly interconnects a steering spindle with a steering mechanism while turning of the steering spindle controls fluid powered movement of the piston between stroke limits established by bypass valve assemblies mounted in the piston.

Auxiliary power steering devices of the foregoing type are already known as disclosed, for example, in German patent publication No. OS 24 12 549 or in U.S. Pat. No. 3,896,703. In such an auxiliary power steering device, two rods anchored to the steering gear housing are received within bores of the operating piston. Each of the rods has a reduced cross-sectional area portion of triangular shape so that prior to the piston reaching its limit position, excess flow of pressurized fluid is conducted from the pressurized operating chamber to the opposing chamber in fluid communication with the exhaust port through which a return flow of fluid is conducted to a fluid reservoir tank. The foregoing rods therefore act as bypass valves causing depressurization of the active operating chamber as the piston approaches its limit position. Cut-off of fluid operating power therefore occurs to avoid any unintentional powered movement of the operating piston at its limit positions.

Another type of travel position limiting, power cutoff device is disclosed in German patent publication No. OS 14 55 939, wherein two ball valves disposed adjacent opposite axial ends of a common bore in the operating piston, normally block flow through the bore under the force of a single spring and the operating pressure in the active operating chamber. Whenever the operating piston approaches one or the other of its limit positions, one of the ball valves is unseated by a pin attached to the housing. A flow passage is thereby established from the steering pump through the inactive operating chamber to the exhaust return port connected to the fluid reservoir tank.

Single function valves for limiting operating pressure are also known as disclosed for example in prior copending application, Ser. No. 41,395, filed May 22, 1979, now U.S. Pat. No. 4,261,248, owned in common with the present application by the same assignee.

Each of the foregoing fluid power cutoff arrangements, has only one function. It is therefore an important object of the present invention to simplify the equipment associated with an auxiliary power steering system having fluid power cutoff means to limit the piston travel and a relief valve for limiting the maximum permissible pressure developed within the active operating chamber of the fluid servomotor during piston travel.

SUMMARY OF THE INVENTION

In accordance with the present invention, both the travel limiting function and maximum pressure limiting function of separate fluid pressure cutoff valves and relief valves heretofore associated with auxiliary power steering systems are performed by single dual function valve assemblies mounted within the operating piston. Each of these valve assemblies includes a cylindrical valve element having one axial end from which a valve actuating pin projects into the operating pressure chamber for reception within a bore of an adjustable depth formed in the housing in order to unseat the valve element when the piston approaches the end of its stroke. A closing bias is exerted on the valve element by a spring, the bias of which is adjustable at an axial end of the spring remote from the valve element. The axial bias of the spring is exerted on a conical end of the valve element opposite the valve actuating pin through an annular thrust disk and ball elements to avoid vibration. Flats are formed on the valve element to form passages within the bore through which fluid is conducted, when the valve element is unseated. The valve elements thus act as bypass valves as well as pressure relief valves. The use of a separate relief valve inserted, for example, into the high pressure steering pump mechanism or the pressure supply line therefrom may therefore be eliminated. Another advantage of the foregoing arrangement resides in the provision of a relief valve within the operating piston itself not accessible from any location externally of the steering gear housing.

BRIEF DESCRIPTION OF THE DRAWING FIGURES

A specific embodiment of the invention will now be explained in more detail with reference to the accompanying drawing, wherein.

DETAILED DESCRIPTION OF PREFERRED EMBODIMENT

Figure 1:
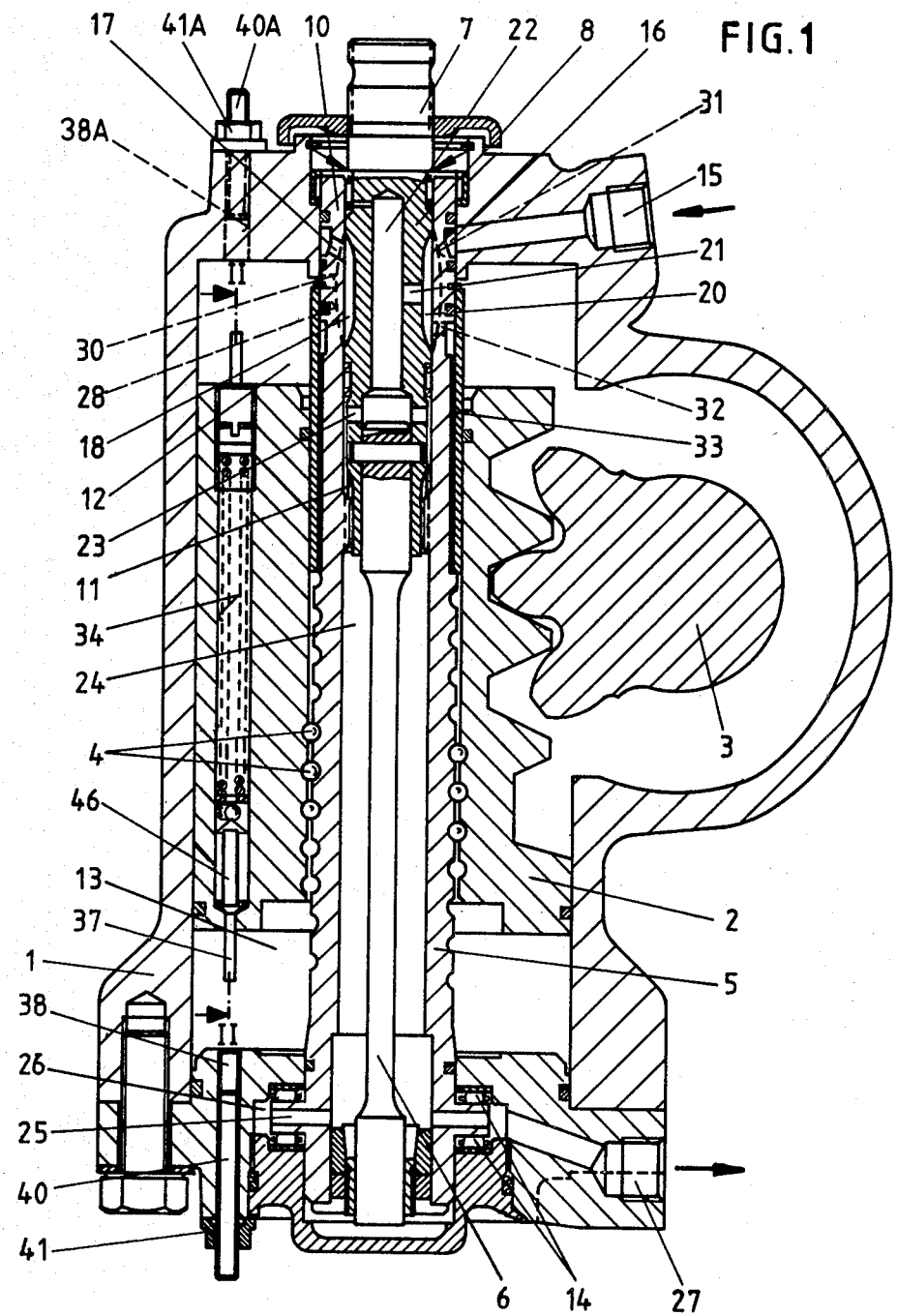
FIG. 1 is a longitudinal section view through an auxiliary power steering device constructed in accordance with the present invention.

Referring now to the drawings in detail, FIG. 1 shows a steering gear housing 1 enclosing a cylindrical space within which a servomotor operating piston 2 is slidably mounted. The piston has rack gear teeth formed thereon enmeshed with segmental gear teeth on a steering gear shaft 3 and constitutes an internal threaded nut drivingly engaged with a screw shaft 5 through antifriction ball elements 4. The steering screw shaft 5 is connected to a steering spindle 7 through a torsion rod 6. The steering spindle 7 includes a rotatable slide valve portion 8 which cooperates with a steering control sleeve 10 formed on the screw shaft 5. The rotatable slide valve portion 8 and the steering control sleeve 10 form a generally known rotatable slide valve assembly, the specific construction of which is disclosed, for example, in German Patent Publication No. OS 26 37 458. After overcoming the steering load within limits predetermined by a spline coupling 11, against the elastic resistance of torsion rod 6, the torque applied to the steering spindle 7 is effective to rotate the screw shaft 5. Relative rotation of the rotatable slide valve portion 8 and steering control sleeve 10 then occurs as a result of which pressurized fluid is conducted to piston operating chamber 12 or 13 depending on the direction of relative rotation. The steering screw shaft 5 is supported adjacent one axial end by an axial bearing assembly 14, within an end wall 13 attached to the housing 1, for absorbing axial thrust.

The housing adjacent an axial end of the screw shaft opposite the axial thrust bearing 14, mounts a pump pressure inlet fitting 15 which is in fluid communication through annular groove 16 and several bores 17 in the steering control sleeve 10 with axial grooves 18 in the rotatable slide valve portion 8 of the screw shaft. Additional axial grooves 20 formed in the slide valve portion 8 are in fluid communication with the pump inlet fitting 15 in the neutral position of the valve assembly and in fluid communication with a central axial bore 22 of the rotatable slide valve portion 8 through transverse bores 21. The central axial bore 22 is in fluid communication with an internal chamber 24 within the screw shaft 5 through transverse bores 23 and clearance passages in the spline coupling 11. The internal chamber 24 of the screw shaft is in fluid communication with an exhaust port fitting 27 in the end wall 13 through transverse bores 25 in the screw shaft and an annular groove 26 in the end wall.

The axial grooves 18 in the rotatable slide valve portion 8 which communicate with the pump inlet fitting 15 upon turning of the spindle 7 by a hand steering wheel (not shown), either conducts pressurized fluid to operating chamber 12 through axial grooves 28 in the steering control sleeve 10 and transverse bores 30, or conducts pressurized fluid to the operating chamber 13 through axial grooves 31, transverse bores 32 of the valve portion 8, annular passage 33 and the external spiral grooving of the screw shaft 5.

Figure 2:
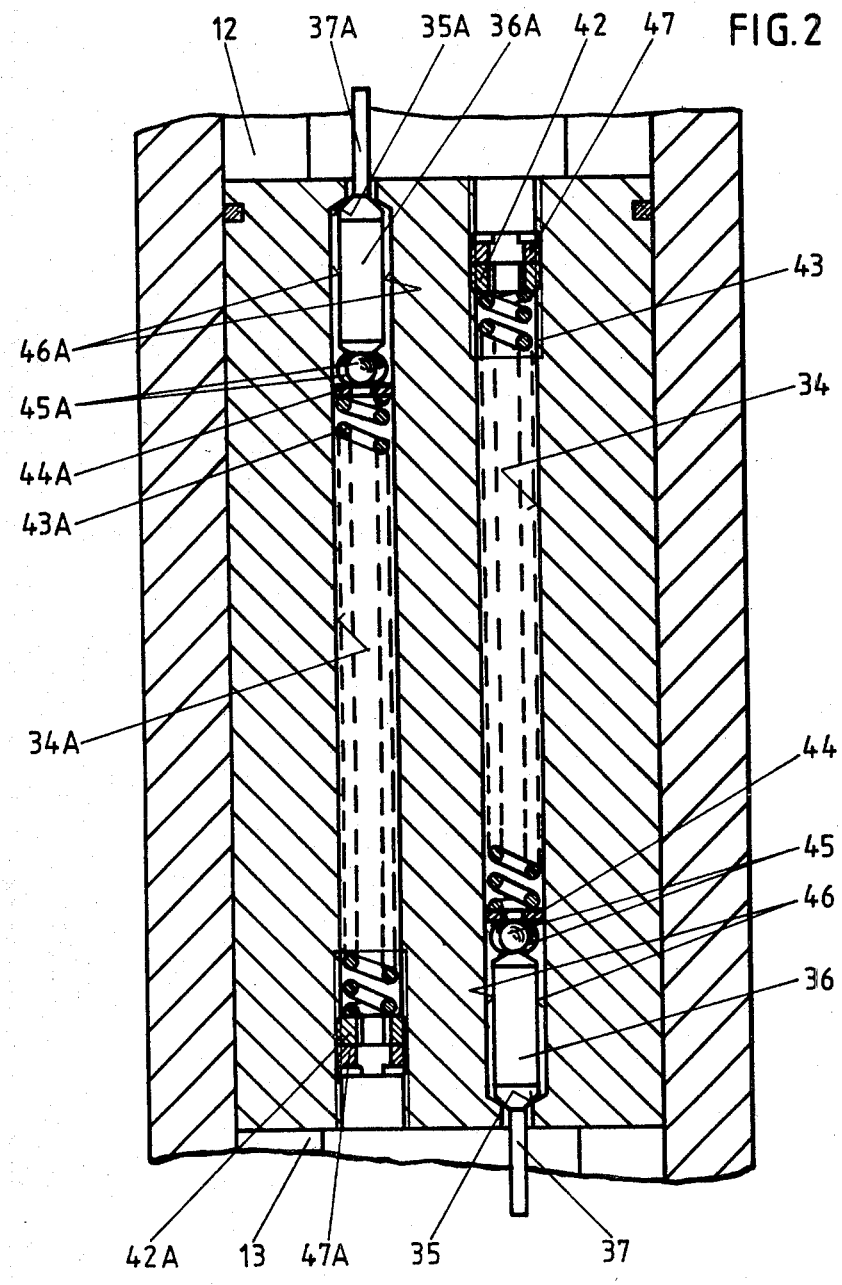
FIG. 2 is an enlarged partial section view taken substantially through a plane indicated by section line 2—2 in FIG. 1.

In accordance with the present invention, the operating piston 2 is provided with two continuous bores 34 and 34A disposed in parallel spaced relationship to the screw shaft 5 as shown in FIG. 2. Cylindrical valve elements 36 and 36A are respectively received within the bores for seating on valve seats 35 and 35A adjacent opposite axial ends of the piston. The valve elements 36 and 36A are respectively provided with actuating pins 37 and 37A which project therefrom for reception within corresponding bores 38 and 38A formed in the housing 1. The depths of the bores 38 and 38A are determined by threaded rods 40 and 40A in adjusted positions fixed by nuts 41 and 41A in order to establish the travel limits of the piston 2 in both directions. The valve elements 36 and 36A are respectively biased by springs 43 and 43A which bear against hollow screws 42 and 42A to respectively urge the valve elements against their associated valve seats 35 and 35A. The hollow screws 42 and 42A are fixed in adjusted positions within the bores 34 and 34A by lock screws 47 and 47A. Between each of the valve elements and its associated spring there are an annular disk 44 or 44A and three balls 45 or 45A aligned with a plane perpendicular to the axis of the bore. The axial end of each valve element facing its associated spring is provided with a conical surface for engagement with the balls urging them radially outward within the bores 34 and 34A. As a result, vibratory movement of the valve elements is avoided. Each of the valve elements is provided with two flats 46 and 46A, for the purpose of conducting pressure fluid through the piston bore 34 or 34A upon unseating of the valve elements.

Each of the valve elements 36 and 36A, associated valve seat 35 and 35A and valve closing springs 43 and 43A constitutes a bypass valve assembly which is operative to cut off the pressure in chamber 12 or 13 acting on one axial end of the operating piston 2 within the housing. The bypass valve assemblies also function as pressure limiting relief valves since one of the valve elements is exposed to the opening bias of pressurized fluid in the active pressurized chamber exerting a displacing force on the piston.

Assuming that the operating piston 2 is being displaced in one axial direction by pressurization of the chamber 12, valve actuating pin 37 projecting into chamber 13 will enter the bore 38 aligned therewith as the piston approaches its limit position. When the pin 37 engages the threaded rod 40, the valve element 36 is displaced from its valve seat 35 against the closing bias of spring 43. Thus, no further movement of the operating piston 2 is possible because the pressurized fluid conducted to chamber 12 from the pump supply fitting 15 will be conducted to the exhaust port 27 through the flats 46 on the valve element to the opposing chamber 13 which is in fluid communication with the exhaust port 27 along a path established by the external spiral grooves on the screw shaft, the annular channel 33, transverse bores 32, axial grooves 31, axial groove 20 in the valve portion 8, transverse bores 31, central axial bore 22, transverse bore 23, spline coupling 11, internal chamber 24 of the screw shaft, transverse bore 25, and annular groove 26 to the exhaust port 27. With respect to movement of the piston 2 in the opposite direction by pressurization of operating chamber 13, valve element 36A is effective in a similar manner to limit axial movement of the piston. Pressurized fluid from chamber 13 in such case is conducted to the exhaust port 27 along a path established by bore 34A to chamber 12 from which the fluid is conducted through transverse bore 30, axial grooves 28, axial groove 20, transverse bores 21 and axial bore 22 in communication with the exhaust port 27 as hereinbefore explained.

Because of the adjustable positioning of the rods 40 and 40A, cut off of pressure within the operating chambers may be synchronized by adjustments made externally of the steering gear housing to accommodate variable steering angles of the steering gear geometry. The bypass valve assemblies furthermore function as fluid operated, pressure limiting relief valves, as aforementioned. Thus, whenever the pressure increases in chamber 13, for example, beyond a certain maximum value, the valve element 36 exposed to the pressurized fluid in chamber 13 opens independently of the position of the operating piston 2 to relieve the pressure in chamber 13. As already explained with respect to the mechanically controlled pressure cutoff travel operation, excess pressure is relieved through bore 34 and the pressure chamber 12. By adjusting the initial bias of the spring 43 or 43A, by means of screws 42 and 47 or 42A and 47A, the permissible maximum pressure developed within the pressurized or active operating chamber may be adjusted in a simple manner. Such adjustment is made possible separately for each operating chamber, so that the maximum pressure for the two operating chambers may be adjusted to inversely proportional pressure levels where the operating piston has pressure surfaces of unequal dimensions. The pressure controlling valve assemblies being disposed internally of the operating piston, have the additional advantage of preventing inexperienced persons from making faulty adjustments.

What is claimed is:

1. In an auxiliary power steering device having a steering gear housing (1) enclosing an operating piston and opposing pressure chambers (12 and 13) to which the piston is exposed and to which pressurized fluid is supplied and exhausted under control of a steering control valve means, and mechanically actuated bypass valve means (36, 36A) mounted within two axial bores (34, 34A) formed in the piston for depressurizing an active one of the opposing chambers in response to arrival of the piston at one of two limit positions, the improvement residing in said bypass valve means including a pair of valve elements and control means associated with each of the valve elements wherein each valve element is rendered operative for limiting travel of the piston by opening thereof to depressurize said one of the opposing pressure chambers only when the piston arrives at one of the travel limit positions thereof in one direction of piston travel and to limit pressure by opening thereof in response to excessive pressure within the active one of the opposing chambers during travel of the piston in the other direction of piston travel to the remaining travel limit position.

2. The improvement as defined in claim 1, wherein the valve control means includes valve biasing springs (43, 43A) with the axial bores, and bias adjusting screws (42, 42A).

3. In an auxiliary power steering device having a steering gear housing (1) enclosing an operating piston (2) and opposing pressure chambers (12 and 13) to which the piston is exposed and to which pressurized fluid is supplied and exhausted under control of a steering control valve means, and mechanically actuated bypass valve means (36, 36A) mounted within two axial bores (34 and 34A) formed in the piston for depressurizing an active one of the opposing chambers in response to approach of the piston to a limit position, the improvement residing in said bypass valve means acting as a relief valve to limit pressure within the active one of the opposing chambers prior to approach of the piston to the limit position, said bypass valve means including a valve seat (35, 35A) formed in each of the bores, a cylindrical valve element (36, 36A) having flats (46, 46A) formed thereon to establish flow passages within the bores, a spring (43, 43A) within each of the bores, each of said valve elements having opposite axial ends, a valve actuating pin (37, 37A) projecting from one of the axial ends of the valve elements that is engageable with the valve seat, three ball elements (45, 45A) disposed within each of the bores engageable with the other end of the valve element in a plane perpendicular to the bore, and an annular disk (44, 44A) axially spacing the ball elements from the spring, said other end of the valve element engageable with the ball element being shaped to engage the ball elements radially outward.

4. In combination with a power steering servomotor having a housing (1) mounting an operating piston (2) displaceable between limit positions by pressurization of opposing chambers (12 and 13) and passage means (8-10) conducting pressurized fluid to one of the chambers for pressurization thereof and exhausting the other of the chambers, dual function valve means (36, 36A) mounted within the piston for depressurizing said one of the chambers as the piston arrives at one of the limit positions and limiting said pressurization of said one of the chambers to a maximum level during travel of the piston by controlling flow of the pressurized fluid between said chambers, said dual function valve means including a pair of valve elements and means controlling actuation of the valve elements for effecting said depressurization by opening of one of the valve elements only in one direction of piston travel when arriving at said one limit position and limiting said pressurization by said one of the valve elements in response to excessive pressure in the other direction of piston travel.

5. The combination of claim 4 wherein each of said valve elements (36, 36A) has opposite ends and is movably mounted in the piston within a bore (34, 34A) which extends between said opposing chambers, said actuation controlling means including spring means (43, 43A) engaged with one of the ends of the valve element for holding thereof in a closed position blocking said flow of fluid between said chambers through the bore with a bias to limit the pressure within said one of the opposing chambers to said maximum level, mechanical means (37, 37A) responsive to approach of the piston to the limit positions for displacing the valve element to an open position against the bias of said spring means, and means for exposing the other of the ends of the valve element to an opening bias of the pressurized fluid in said one of the chambers to enable performance of said pressure limiting function for the valve means.

6. The combination of claim 5 including means (44, 45, 44A, 45A) for transmitting the closing bias of the spring means to the valve element to prevent vibration thereof.

* * * * *